United States Patent
Kim

(10) Patent No.: US 11,544,004 B2
(45) Date of Patent: Jan. 3, 2023

(54) NONVOLATILE MEMORY DEVICE AND MEMORY SYSTEM INCLUDING THE SAME

(71) Applicant: SK hynix Inc., Icheon (KR)

(72) Inventor: Hyun Jun Kim, Icheon (KR)

(73) Assignee: SK hynix Inc., Icheon (KR)

( * ) Notice: Subject to any disclaimer, the term of this patent is extended or adjusted under 35 U.S.C. 154(b) by 198 days.

(21) Appl. No.: 16/901,865

(22) Filed: Jun. 15, 2020

(65) Prior Publication Data
US 2021/0223989 A1 Jul. 22, 2021

(30) Foreign Application Priority Data
Jan. 20, 2020 (KR) .......................... 10-2020-0007401

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0679* (2013.01)

(58) Field of Classification Search
CPC .... G06F 3/0659; G06F 3/0634; G06F 3/0679; G06F 3/0604; G06F 3/0653; G06F 12/0292; G11C 16/10
See application file for complete search history.

(56) References Cited

U.S. PATENT DOCUMENTS

| | | | | |
|---|---|---|---|---|
| 5,613,063 A * | 3/1997 | Eustace | ................. | G06F 11/366 714/38.1 |
| 5,809,228 A * | 9/1998 | Langendorf | ........ | G06F 11/1056 714/763 |
| 2003/0106010 A1* | 6/2003 | Fujioka | ................. | G11C 11/406 714/763 |
| 2003/0137873 A1* | 7/2003 | Kawamura | .............. | G11C 8/08 365/185.11 |
| 2010/0162053 A1* | 6/2010 | Gillingham | ........... | H03M 13/09 714/49 |
| 2014/0244903 A1* | 8/2014 | Yano | .................... | G11C 11/5628 711/104 |
| 2015/0019936 A1* | 1/2015 | Gillingham | ......... | G06F 11/1076 714/764 |
| 2015/0355854 A1* | 12/2015 | Song | ..................... | G06F 3/0611 711/103 |

(Continued)

FOREIGN PATENT DOCUMENTS

KR 101687038 B1 12/2016

OTHER PUBLICATIONS

Kim, Jungrae, et al. "All-inclusive ecc: Thorough end-to-end protection for reliable computer memory." 2016 ACM/IEEE 43rd Annual International Symposium on Computer Architecture (ISCA). IEEE, 2016. (Year: 2016).*

(Continued)

*Primary Examiner* — Francisco A Grullon

(57) ABSTRACT

A nonvolatile memory device may include a plurality of memory regions and a control logic configured to correct a write command transmitted from an external device. The control logic may correct a write command upon determining the suitability of the write command, and perform a write operation on a target memory region based on a corrected write command. The control logic may determine the suitability of the write command based on check information associated with target memory region.

15 Claims, 7 Drawing Sheets

(56) References Cited

U.S. PATENT DOCUMENTS

2018/0024897 A1* 1/2018 Cai .................. G06F 11/16
714/6.12

OTHER PUBLICATIONS

Liu, Duo, et al. "A workload-aware flash translation layer enhancing performance and lifespan of TLC/SLC dual-mode flash memory in embedded systems." Microprocessors and Microsystems 52 (2017): 343-354. (Year: 2017).*

* cited by examiner

NONVOLATILE MEMORY DEVICE AND MEMORY SYSTEM INCLUDING THE SAME

CROSS-REFERENCES TO RELATED APPLICATION

The present application claims priority under 35 U.S.C. § 119(a) to Korean application number 10-2020-0007401, filed on Jan. 20, 2020, in the Korean Intellectual Property Office, which is incorporated herein by reference in its entirety.

BACKGROUND

1. Technical Field

Various embodiments generally relate to a nonvolatile memory device and a memory system including the same.

2. Related Art

A memory system may be configured to store data provided from a host device in response to a write request received from the host device. Also, the memory system may be configured to provide data stored therein to the host device in response to a read request received from the host device. The host device is an electronic device capable of processing data, and may include a computer, digital camera, mobile phone, or other computing devices. Further, the memory system may be embedded in the host device or a separate device (e.g., separately fabricated) from the host device and connected or communicatively coupled to the host device.

SUMMARY

Various embodiments of the disclosed technology are directed to a nonvolatile memory device, and memory system including the memory device, that is configured to correct or modify erroneous and/or unsuitable commands, such as write commands. The nonvolatile memory device, thus, can improve the data reliability and operation performance of the device or memory system, among other benefits.

In an embodiment, a nonvolatile memory device may include: a plurality of memory regions; and a control logic configured to: correct a write command based on a determination that the write command does not match check information for a target memory region of the plurality of memory regions, the write command transmitted by an external device; and perform a write operation to the target memory region of the plurality of memory regions using the corrected write command.

In an embodiment, a nonvolatile memory device may include: a plurality of memory regions; and a control logic, the control logic including: a check information memory that stores check information for each memory region of the plurality of memory regions; and a command checker that reads check information for a target memory region of the plurality of memory regions from the check information memory; wherein the control logic performs a write operation to the target memory region based on the check information for the target memory region in response to receiving a write command from an external device.

In an embodiment, a memory system may include: a nonvolatile memory device including a plurality of memory regions; and a controller configured to: transmit a check information table that includes check information for the plurality of memory regions to the nonvolatile memory device; and transmit a write command and a write mode of the write command to the nonvolatile memory device; wherein the nonvolatile memory device performs a write operation in a corrected write mode when the nonvolatile memory device determines, based on the check information table, that the write mode of the write command is erroneous.

The nonvolatile memory device that can improve data reliability and operation performance by correcting an unsuitable command, and a memory system including the same are provided.

DETAILED DESCRIPTION

Figure 1:
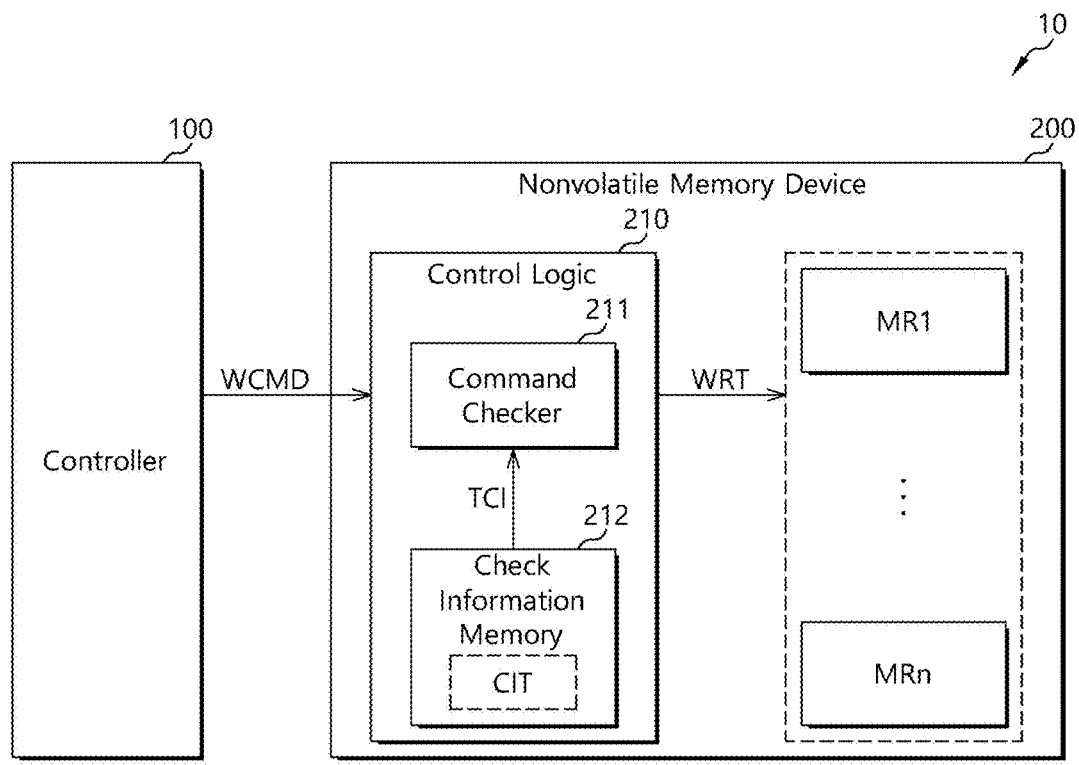
FIG. 1 illustrates a memory system in accordance with an embodiment.

The advantages and characteristics of the present disclosure and a method for achieving the advantages and characteristics will be described through the following embodiments with reference to the accompanying drawings. However, the present disclosure is not limited to the embodiments described herein, but may be embodied in different manners. The present embodiments are only provided to describe the present disclosure in detail, such that the technical idea of the present disclosure can be easily carried out by those skilled in the art to which the present disclosure pertains.

The present embodiments are not limited to specific shapes illustrated in the drawings, but may be exaggerated for clarity. In this specification, specific terms are used. However, the terms are only used to describe the present disclosure, and not used to limit the meaning or scope of the present disclosure, described in claims.

In this specification, an expression such as 'and/or' may indicate including one or more of components listed before/after the expression. Moreover, an expression such as 'connected/coupled' may indicate that one element is directly connected/coupled to another element or indirectly connected/coupled to another element through still another element. The terms of a singular form may include plural forms unless referred to the contrary. Furthermore, the meanings of 'include' and 'comprise' or 'including' and 'comprising' may specify a component, step, operation and element, and do not exclude the presence or addition of one or more other components, steps, operations and elements.

Hereafter, embodiments will be described in detail with reference to the accompanying drawings.

FIG. 1 illustrates a memory system 10 in accordance with an embodiment.

The memory system 10 may be configured to store data provided from and received by an external host device (not illustrated) in response to a write request sent from the host device to the memory system 10. Furthermore, the memory system 10 may be configured to provide data stored therein to the host device in response to a read request received from the host device.

The memory system 10 may be configured as a PCMCIA (Personal Computer Memory Card International Association) card, CF (Compact Flash) card, smart media card, memory stick, various multimedia cards (MMC (MultiMediaCard), eMMC (embedded MMC), RS-MMC (Reduced-Size MMC) and MMC-micro), SD (Secure Digital) card (SD, Mini-SD, Micro-SD), UFS (Universal Flash Storage), SSD (Solid State Drive) or other memory cards.

The memory system 10 may include a controller 100 and a nonvolatile memory device 200. In an embodiment, the controller 100 is a digital circuit that manages the flow of data going to and from the nonvolatile memory device 200. The controller may be formed on a chip independently or integrated with one or more other circuits.

The controller 100 may control overall operations of the memory system 10. The controller 100 may control the nonvolatile memory device 200 to perform a foreground operation according to an instruction received from the host device. The foreground operation may include an operation of writing data to the nonvolatile memory device 200 or an operation of reading data from the nonvolatile memory device 200 according to instructions received from the host device. An example instruction may be a write request or a read request sent from the host device and received by the memory system 10.

The controller 100 may control the nonvolatile memory device 200 to perform a background operation to the nonvolatile memory device 200, without receiving an instruction from the host device. The background operation may include a wear-leveling operation, a garbage collection operation, an erase operation, a read reclaim operation and/or a refresh operation performed on the nonvolatile memory device 200. Also, the background operation may include an operation of writing data to the nonvolatile memory device 200 and reading data from the nonvolatile memory device 200, similar to the foreground operations described herein.

For example, the controller 100 may transmit a write command (WCMD) to the nonvolatile memory device 200 in order to write data to the nonvolatile memory device 200. As is described herein, the write command (WCMD) may include information on or identifying a target memory region to which data is to be stored, where the target memory region is one of multiple memory regions MR1 to MRn. The write command (WCMD) may also include information on or identifying a write mode for the data.

Under control of the controller 100, the nonvolatile memory device 200 may store data transmitted from the controller 100 to the nonvolatile memory device 200, and read data stored in the memory device 200 and transmit the read data to the controller 100.

The nonvolatile memory device 200 may include a control logic 210 and the memory regions MR1 to MRn.

The control logic 210 may control overall operations of the nonvolatile memory device 200. The control logic 210 may control an internal operation of the nonvolatile memory device 200 in response to a command transmitted from the controller 100.

Specifically, the control logic 210 may perform a write operation (WRT) on the target memory region (selected from the memory regions MR1 to MRn) in response to the write command (WCMD) transmitted from the controller 100 and received by the control logic 210. The write command (WCMD) may indicate a write mode to be followed by the control logic 210, selected from various available write modes for writing the data to the target memory region.

For example, the write mode may include a SLC (single level cell) write mode, an MLC (multi-level cell) write mode, a TLC (triple level cell) write mode and a strong SLC write mode. The SLC write mode may be a write mode for storing one bit in each memory cell. The MLC write mode may be a write mode for storing two bits in each memory cell. The TLC write mode may be a write mode for storing three bits in each memory cell. The strong SLC write mode may be a write mode for storing one bit in each memory cell, while forming threshold voltage distributions of memory cells with wide intervals provided between the threshold voltage distributions. The strong SLC write mode can retain data reliability for a longer time than the normal SLC write mode.

In an embodiment, the write mode may include a write mode for storing four or more bits.

The controller 100 may designate the write mode of the write command (WCMD) according to the type of data associated with the write command (WCMD). For example, firmware may be written in the strong SLC write mode in order to guarantee high reliability of the data. As another example, cold data may be written in the TLC write mode in order to increase storage efficiency of the data.

Therefore, the controller 100 may determine the type of data to be stored in each of the memory regions MR1 to MRn before the data is received from the host device. According to the determination of the type of data, the controller 100 may previously or independently designate a write mode for each of the memory regions MR1 to MRn. For example, when deciding to store firmware in a certain memory region, the controller 100 may designate the write mode for the corresponding memory region as the strong SLC write mode.

In some cases, the controller 100 may generate a write command (WCMD) with a wrong or erroneous write mode, due to an error during operation, and transmit the write command (WCMD) to the nonvolatile memory device 200. For example, the controller 100 may generate a write command (WCMD) to write firmware in the TLC write mode, even though the firmware should be written in the strong SLC write mode. In such cases, the corresponding firmware may be written in an unsuitable write mode and thus highly likely to be corrupted.

In order to avoid data being written in unsuitable write modes, the control logic 210 may directly or independently determine the suitability of the write command (WCMD) transmitted from the controller 100. According to the determination result, the control logic 210 may correct the write command (WCMD) and perform a write operation (WRT) with the corrected write command (WCMD).

Specifically, the control logic 210 may determine whether the received write command (WCMD) properly or accurately indicates the write mode previously designated for a target memory region in order to determine the suitability of the write command (WCMD). When the write command (WCMD) indicates or includes the write mode previously designated for the target memory region, the control logic 210 may perform the write operation (WRT) based on the received write command (WCMD), without correcting the received write command (WCMD).

On the other hand, when the received write command (WCMD) does not indicate the write mode previously designated for the target memory region, the control logic 210 may correct the write command (WCMD) to indicate the write mode previously designated for the target memory region and perform the write operation (WRT) based on the corrected write command (WCMD).

In an embodiment, the control logic 210 may include a command checker 211 and a check information memory 212.

The command checker 211 may determine the suitability or accuracy of the write command (WCMD) transmitted from the controller 100 to the control logic 210, based on a check information table (CIT) stored in the check information memory 212. The command checker 211 may correct the write command (WCMD) according to the determination of the suitability of the write command (WCMD).

Specifically, the command checker 211 may first read check information (TCI) for the target memory region from the check information memory 212 in response to receiving the write command (WCMD). The command checker 211 may determine whether the write mode of the write command (WCMD) matches the write mode designated for the target memory region based on the check information (TCI) of the target memory region.

When determining that the write mode of the write command (WCMD) matches the write mode designated for the target memory region, the command checker 211 may not correct the write command (WCMD). On the other hand, when determining that the write mode of the write command (WCMD) does not match the write mode designated for the target memory region, the command checker 211 may correct, modify, or update the write command (WCMD) to be the write mode that matches the write mode designated for the target memory region.

The check information memory 212 may store the check information table (CIT), which includes or contains check information (TCI) of the memory regions MR1 to MRn.

The check information (TCI) of each of the memory regions MR1 to MRn may include information on or about the write mode designated for each of the memory regions, such as the write mode to be performed for data stored to each memory region. For example, the check information (TCI) of the target memory region may include information on or about the write mode designated for the target memory region.

In an embodiment, the check information memory 212 may be configured as nonvolatile memory or volatile memory.

n an embodiment, the check information memory 212 may be located in the nonvolatile memory device 200 as a separate unit from the control logic 210.

In an embodiment, the check information memory 212 may be implemented as a part of a buffer memory. The buffer memory may be a buffer for temporarily storing data transmitted from the controller 100, before the data is stored to the memory regions MR1 to MRn. For example, the buffer memory may be a page buffer.

In an embodiment, the check information table (CIT) may be transmitted from the controller 100 and stored in the check information memory 212. This process is described in detail with reference to FIG. 3.

Each of the memory regions MR1 to MRn may be configured as a memory cell array that includes a plurality of memory cells.

As described above, each of the memory regions MR1 to MRn may be used or designated for a specific purpose, such as to store a specific type of data. Thus, a specific write mode may be designated for each memory region.

A memory region may correspond to the memory unit for which the nonvolatile memory device 200 performs an erase operation. In other words, the nonvolatile memory device 200 may perform an erase operation on a memory region level. However, the present embodiment is not limited to memory region level erase operations.

The nonvolatile memory device 200 may include a flash memory device such as NAND flash or NOR flash, FeRAM (Ferroelectric Random Access Memory), PCRAM (Phase-Change Random Access Memory), MRAM (Magnetic Random Access Memory) or ReRAM (Resistive Random Access Memory).

The nonvolatile memory device 200 may include one or more planes, one or more memory chips, one or more memory dies, and/or one or more memory packages.

While FIG. 1 depicts the memory system 10 including one nonvolatile memory device 200, the memory system 10 may include multiple nonvolatile memory devices, and the number of nonvolatile memory devices included in the memory system 10 is not limited to what is depicted in FIG. 1.

Figure 2:
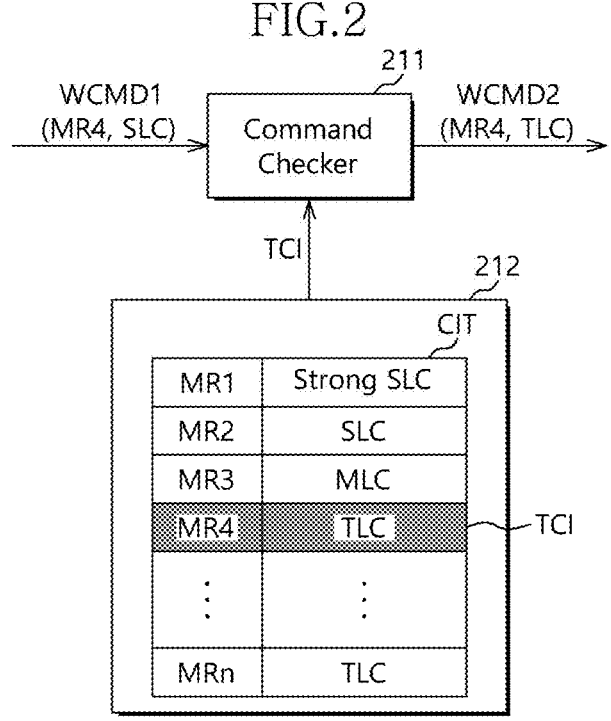
FIG. 2 illustrates a method performed by a command checker in accordance with an embodiment.

FIG. 2 illustrates a method performed by the command checker 211 in accordance with an embodiment. FIG. 2 also illustrates the check information table (CIT) stored in the check information memory 212 of FIG. 1.

Referring to FIG. 2, the check information table (CIT) may include information on the write modes designated for or associated with each of the memory regions MR1 to MRn, such as those depicted in FIG. 1. For example, the write mode of the memory region MR1 may be the strong SLC write mode the write mode of the memory region MR2 may be the normal SLC write mode, the write mode of the memory region MR3 may be the MLC write mode the write mode of the memory region MR4 may be the TLC write mode, and the write mode of the memory region MRn may be the TLC write mode.

The command checker 211 may receive a write command (WCMD1) from the controller 100. The received write command (WCMD1) may indicate that the target memory region is the memory region MR4 and the write mode is the SLC write mode.

The command checker 211 may read the check information (TCI) of the target memory region MR4 from the check information memory 212 in response to the received write command (WCMD1). The command checker 211 may check the check information (TCI) in order to confirm or verify that the write mode designated for the target memory region MR4 is the TLC write mode.

The command checker 211 may determine that the write mode of the received write command (WCMD1), in this example the SLC write mode, does not coincide with the write mode designated for the target memory region MR4, which is the TLC write mode. In response to the determination, the command checker 211 may correct or modify the received write command (WCMD1) to a corrected or modified write command (WCMD2) such that the received write command WCMD1 now or subsequently indicates the TLC write mode, which was designated for the target memory region MR4.

When the received write command (WCMD1) indicates the correct write mode for the target memory region MR4, the TLC write mode, the command checker 211 may determine that the received write command (WCMD1) is suitable or accurate (based on the check information (TCI) for the target memory region MR4), and not correct the received write command (WCMD1).

Thus, the nonvolatile memory device 200 may determine the suitability or accuracy of the received write command (WCMD1) transmitted from the controller 100, and directly correct, modify or update the received write command (WCMD1) to the corrected write command (WCMD2), based on the determination. As a result, the nonvolatile memory device 200 may write data to the target memory region MR4 in the suitable or correct write mode (e.g., the TLC write mode). Therefore, the nonvolatile memory device 200 may prepare for and mitigate operation errors of the controller 100, preventing the corruption of data stored by the nonvolatile memory device 200.

Figure 3:
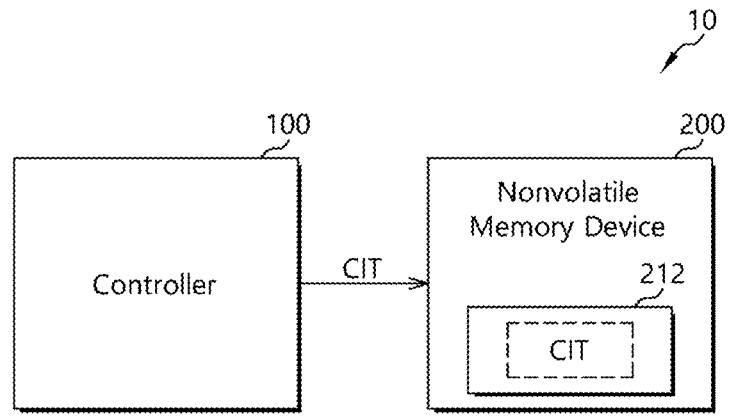
FIG. 3 illustrates a method performed by a memory system in accordance with an embodiment.

FIG. 3 illustrates a method performed by the memory system 10 in accordance with an embodiment.

Referring to FIG. 3, the controller 100 may transmit the check information table (CIT) to the nonvolatile memory device 200. The nonvolatile memory device 200 may store the check information table (CIT) transmitted from the controller 100 in the check information memory 212.

In an embodiment, the controller 100 may transmit a check information table (CIT) previously generated or updated before the memory system 10 was fabricated to the nonvolatile memory device 200.

In an embodiment, the controller 100 may designate the write modes for each of the memory regions MR1 to MRn, generate the check information table (CIT) based on the designated write modes, and transmit the generated check information table (CIT) to the nonvolatile memory device 200. The controller 100 may designate the write mode for each of the memory regions MR1 to MRn by designating an original write mode for each of the memory regions MR1 to MRn and/or changing the write mode for each of the memory regions MR1 to MRn.

In an embodiment, the controller 100 may transmit the check information table (CIT) to the nonvolatile memory device 200 during a booting operation of the nonvolatile memory device 200. In an embodiment, the controller 100 may transmit the check information table (CIT) to the nonvolatile memory device 200 during the operation of the memory system 10.

In an embodiment, the controller 100 may change the check information of at least some of the memory regions MR1 to MRn, and transmit the changed check information to the nonvolatile memory device 200. The nonvolatile memory device 200 may receive the changed check information from the controller 100, and update the check information table (CIT) to include the changed check information.

Figure 4:
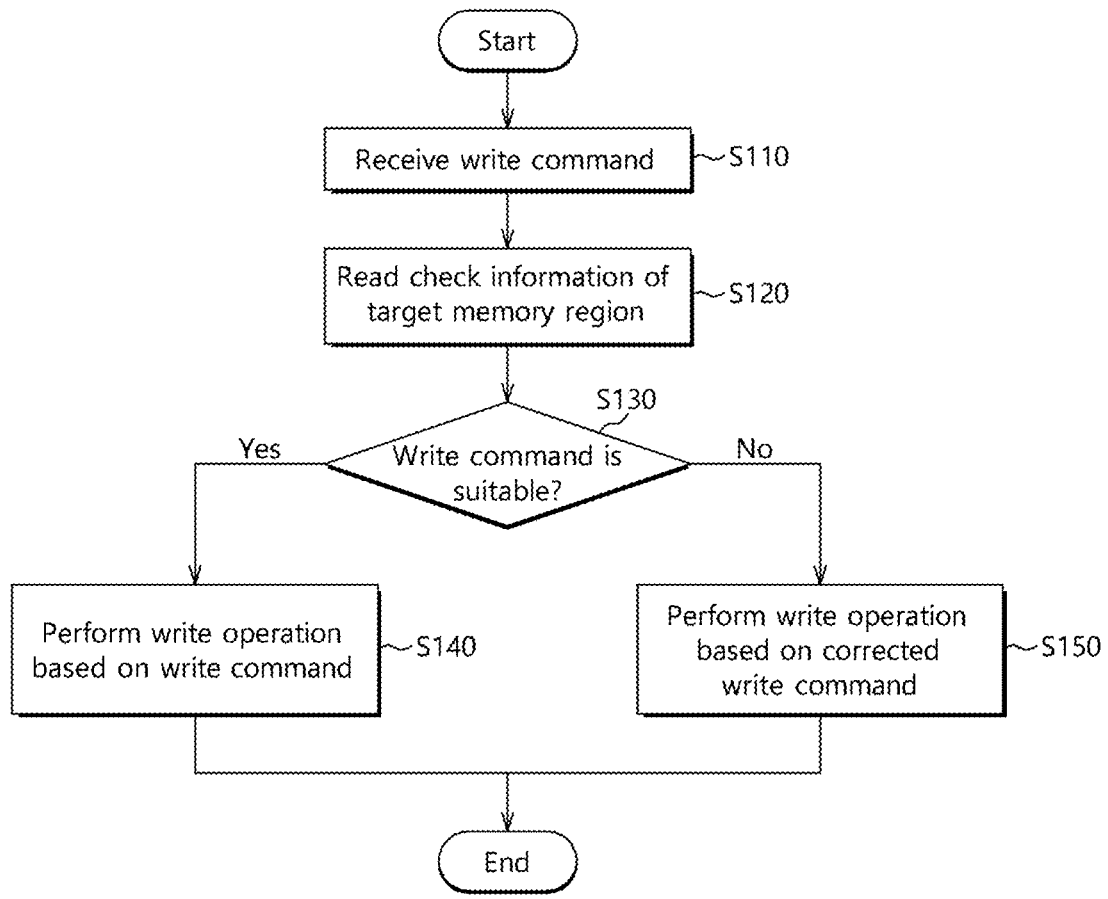
FIG. 4 illustrates a method performed by a nonvolatile memory device in accordance with an embodiment.

FIG. 4 illustrates a method performed by the nonvolatile memory device 200 in accordance with an embodiment.

Referring to FIG. 4, the nonvolatile memory device 200 may receive the write command (WCMD) from the controller 100 in step S110.

In step S120, in response to receiving the write command (WCMD), the nonvolatile memory device 200 may read the check information (TCI) of the target memory region from the check information memory 212.

In step S130, the nonvolatile memory device 200 may determine the suitability or accuracy of the write command (WCMD) based on the check information (TCI) read from the target memory region. In other words, the nonvolatile memory device 200 may determine whether the write command (WCMD) is a correct write command for the target memory region based on the check information (TCI) associated with the memory region. When it is determined that the write command (WCMD) is suitable, the method proceeds to step S140. When it is determined that the write command (WCMD) is not suitable, the method proceeds to step S150.

In step S140, the nonvolatile memory device 200 may perform the write operation (WRT) on the target memory region based on the write command (WCMD). That is, the nonvolatile memory device 200 may perform the write operation WRT on the target memory region in the write mode indicated by the write command WCMD received by the nonvolatile memory device 200 (e.g., without correcting the write command).

In step S150, the nonvolatile memory device 200 may perform the write operation (WRT) on the target memory region based on a corrected write command (WCMD). That is, the nonvolatile memory device 200 may correct the write command (WCMD) in order to perform the write operation (WRT) in the write mode designated for the target memory region. As a result, the nonvolatile memory device 200 may perform the write operation (WRT) on the target memory region using a suitable or correct write mode based on the corrected write command.

Figure 5:
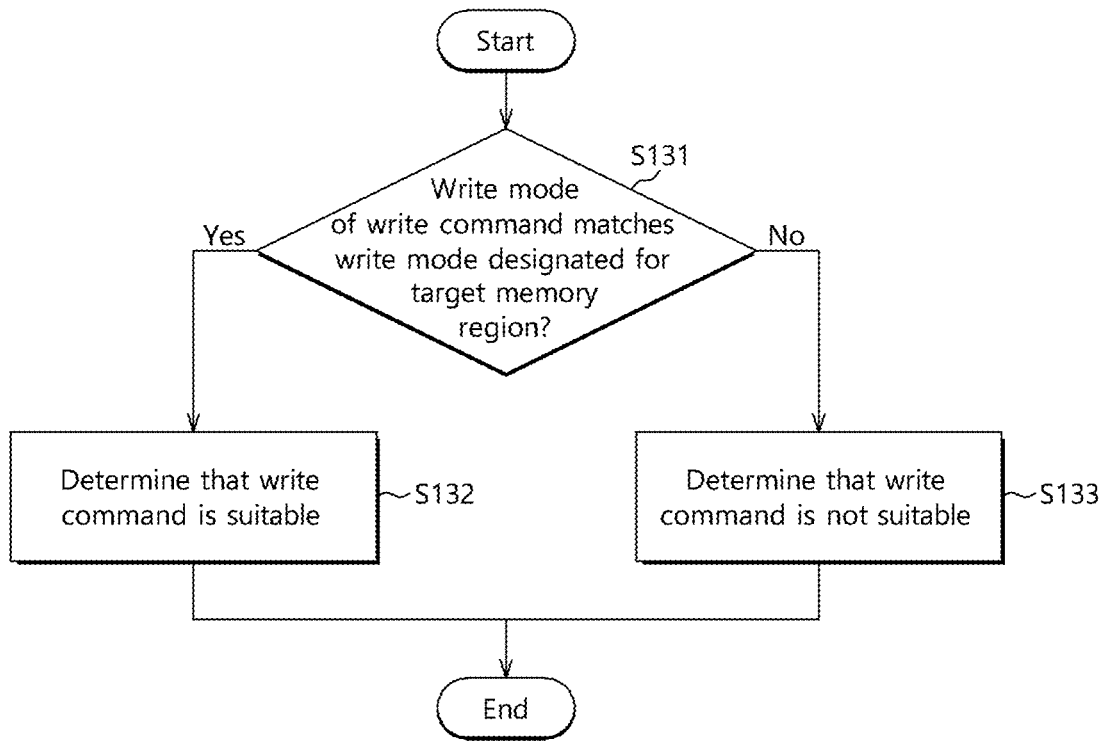
FIG. 5 illustrates a method performed by the nonvolatile memory device in accordance with an embodiment.

FIG. 5 illustrates a method performed by the nonvolatile memory device 200 in accordance with an embodiment. In an embodiment, the steps S131 to S133 of FIG. 5 may be part of step S130 of FIG. 4.

Referring to FIG. 5, in step S131, the nonvolatile memory device 200 may determine whether the write mode of the write command (WCMD) matches the write mode previously designated for the target memory region based on the check information (TCI) of the target memory region. When the write mode of the write command (WCMD) matches the write mode designated for the target memory region, the method proceeds to step S132. When the write mode of the write command (WCMD) does not match the write mode designated for the target memory region, the method proceeds to step S133.

In step S132, the nonvolatile memory device 200 may determine that the write command (WCMD) is suitable or correct.

In step S133, the nonvolatile memory device 200 may determine that the write command (WCMD) is not suitable or erroneous.

Figure 6:
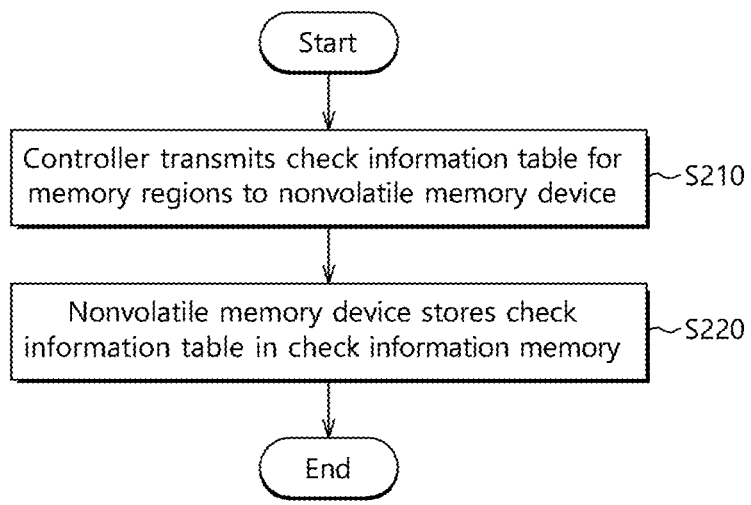
FIG. 6 illustrates a method performed by a memory system in accordance with an embodiment.

FIG. 6 illustrates a method performed by the memory system 10 in accordance with an embodiment.

Referring to FIG. 6, in step S210, the controller 100 may transmit the check information table (CIT) for the memory regions MR1 to MRn to the nonvolatile memory device 200. The check information table (CIT) may include the check information for each of the memory regions MR1 to MRn. The check information of each of the memory regions may include information on the write mode designated for each memory region.

In step S220, the nonvolatile memory device 200 may store the check information table (CIT) transmitted from the controller 100 to the check information memory 212. Then, the nonvolatile memory device 200 may determine the suitability of the write command (WCMD) by referring to the check information table (CIT), whenever the write command (WCMD) is received from the controller 100.

Figure 7:
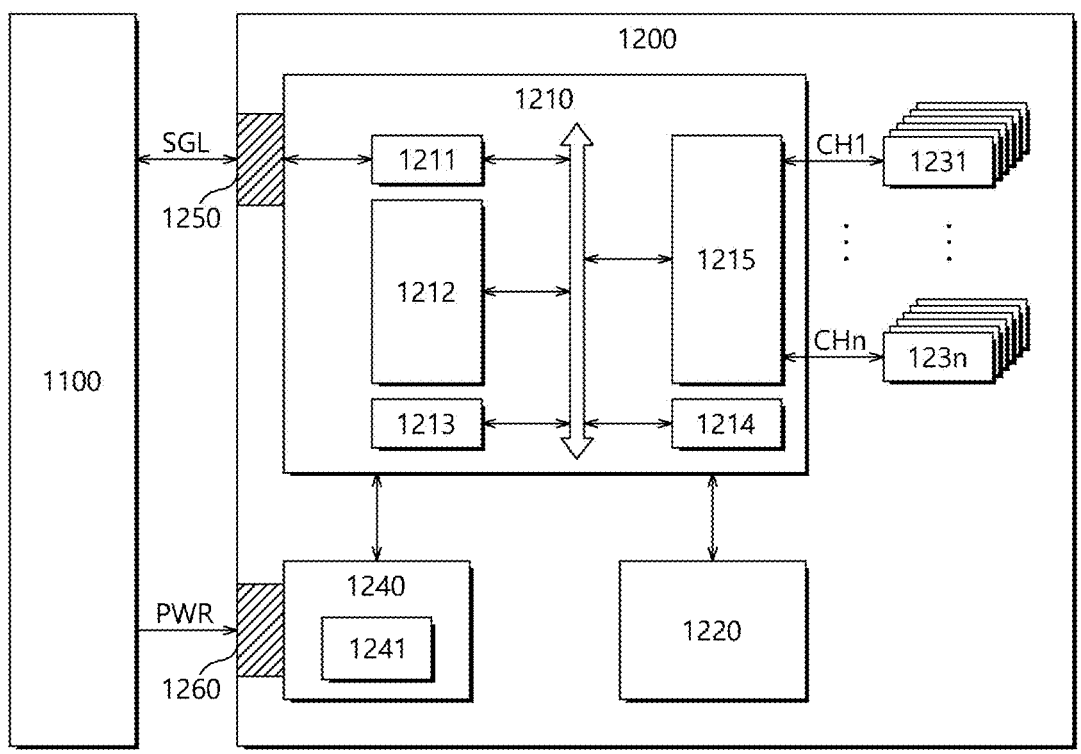
FIG. 7 illustrates a data processing system including a solid state drive (SSD) in accordance with an embodiment.

FIG. 7 illustrates a data processing system 1000 including a solid state drive (SSD) 1200 in accordance with an embodiment. Referring to FIG. 7, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include the controller 100 shown in FIG. 1.

The controller 1210 may include a host interface unit 1211, a control unit 1212, a random access memory 1213, an error correction code (ECC) unit 1214, and a memory interface unit 1215.

The host interface unit 1211 may exchange a signal (SGL) with the host device 1100 through the signal connector 1250. The signal (SGL) may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and/or universal flash storage (UFS).

The control unit 1212 may analyze and process the signal (SGL) received from the host device 1100. The control unit 1212 may control operations of internal function blocks according to firmware or software for driving the SSD 1200. The random access memory 1213 may be used as a working memory for driving the firmware or software.

The ECC unit 1214 may generate the parity data for the data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n based on the parity data. If a detected error is within a correctable range, the ECC unit 1214 may correct the detected error.

The memory interface unit 1215 may provide control signals, such as commands and addresses, to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus. Each of the nonvolatile memory devices 1231 to 123n may be configured in the same manner as the nonvolatile memory device 200 shown in FIG. 1.

The power supply 1240 may provide power (PWR), inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 8:
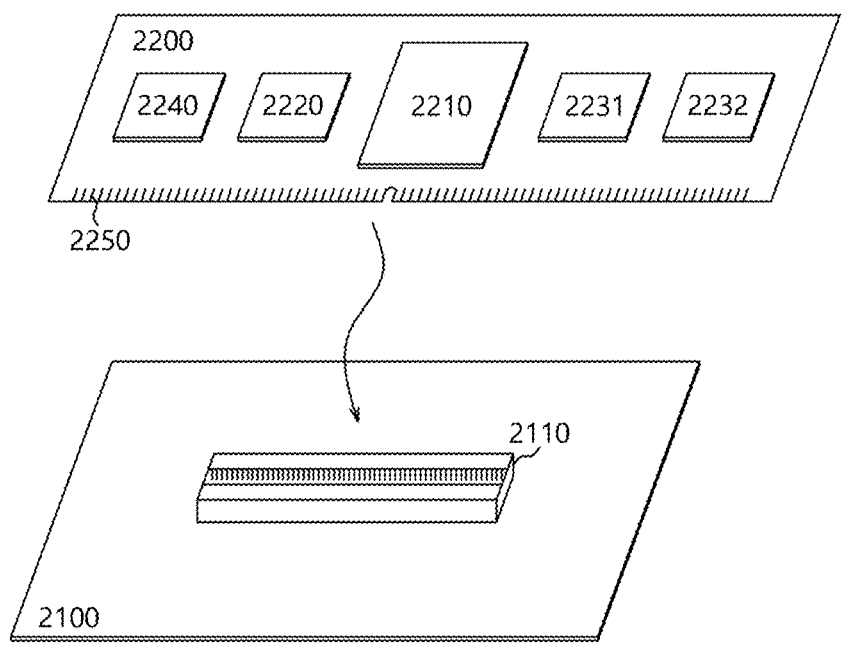
FIG. 8 illustrates a data processing system including a memory system in accordance with an embodiment.

FIG. 8 illustrates a data processing system 2000 including a memory system 2200 in accordance with an embodiment. Referring to FIG. 8, the data processing system 2000 may include a host device 2100 and the memory system 2200.

The host device 2100 may be configured in the form of a board, such as a printed circuit board. Although not shown, the host device 2100 may include internal function blocks for performing the functions of a host device.

The host device 2100 may include a connection terminal 2110, such as a socket, a slot, or a connector. The memory system 2200 may be mounted to the connection terminal 2110.

The memory system 2200 may be configured in the form of a board, such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 7.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 9:
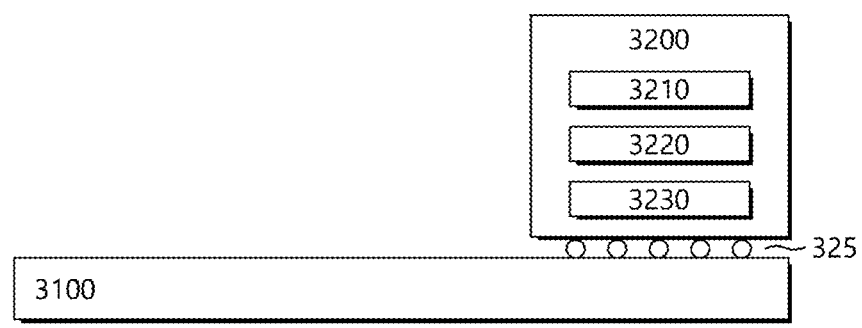
FIG. 9 illustrates a data processing system including a memory system in accordance with an embodiment.

FIG. 9 illustrates a data processing system 3000 including a memory system 3200 in accordance with an embodiment. Referring to FIG. 9, the data processing system 3000 may include a host device 3100 and the memory system 3200.

The host device 3100 may be configured in the form of a board, such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 7.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 10:
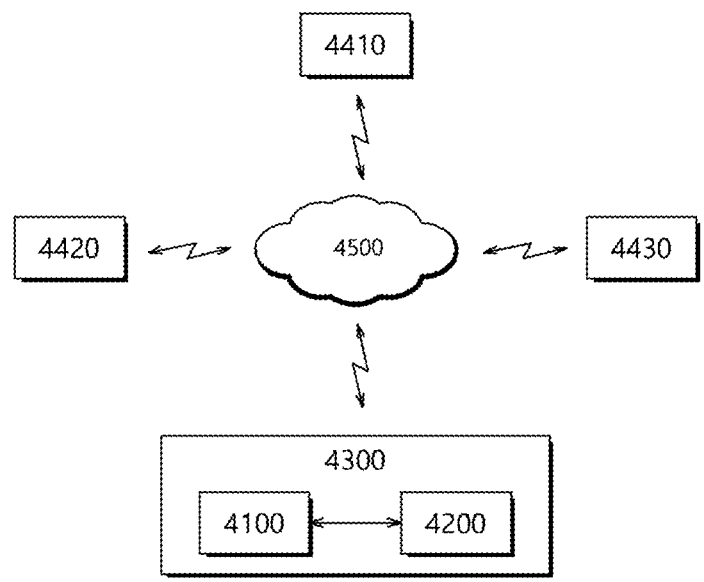
FIG. 10 illustrates a network system including a memory system in accordance with an embodiment.

FIG. 10 illustrates a network system 4000 including a memory system 4200 in accordance with an embodiment. Referring to FIG. 10, the network system 4000 may include a server system 4300 and a plurality of client systems 4410 to 4430, which are coupled through a network 4500.

The server system 4300 may serve data in response to requests received from the plurality of client systems 4410 to 4430. For example, the server system 4300 may store the data provided from the plurality of client systems 4410 to 4430. As another example, the server system 4300 may provide, send, or transmit data to the plurality of client systems 4410 to 4430.

The server system 4300 may include a host device 4100 and the memory system 4200. The memory system 4200 may be configured by the memory system 10 shown in FIG. 1, the SSD 1200 shown in FIG. 7, the memory system 2200 shown in FIG. 8, and/or the memory system 3200 shown in FIG. 9.

Figure 11:
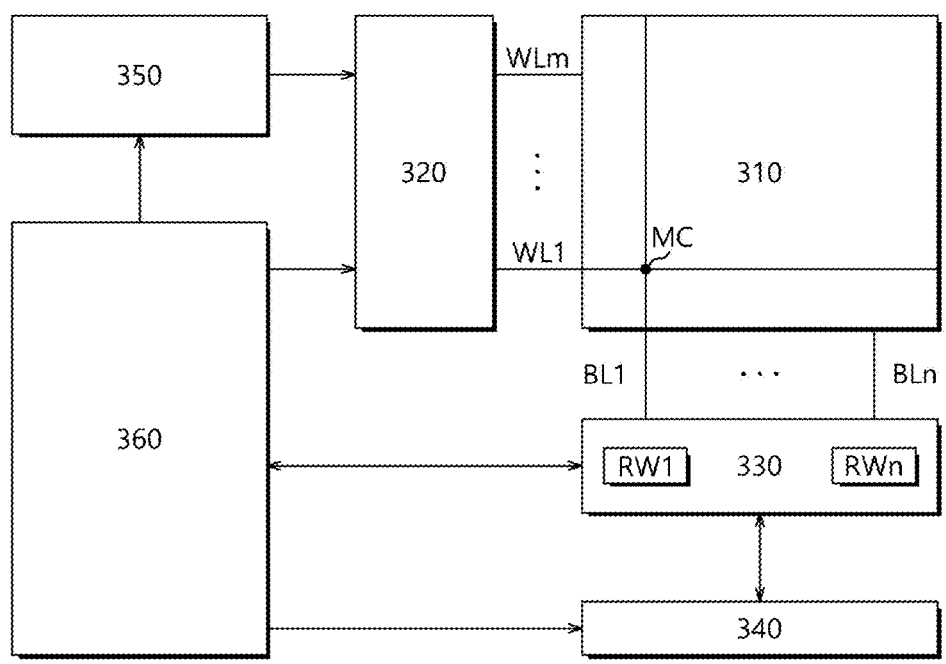
FIG. 11 illustrates a nonvolatile memory device included in a memory system in accordance with an embodiment.

FIG. 11 illustrates a nonvolatile memory device 300 included in a memory system in accordance with an embodiment. Referring to FIG. 11, the nonvolatile memory device 300 may include a memory cell array 310, a row decoder 320, a data read/write block 330, a column decoder 340, a voltage generator 350, and a control logic 360.

The memory cell array 310 may include memory cells (MC) which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For example, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver, which stores data provided from the external device in the memory cell array 310 in a write operation. As another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330, respectively, corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. As another example, an erase voltage generated in an erase operation may be applied to a well area of memory cells for which the erase operation is to be performed. In another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300. The control logic 360 may be configured in the same manner as the control logic 210 shown in FIG. 1. The control logic 360 may include the command checker 211 and the check information memory 212 shown in FIG. 1.

While various embodiments have been described above, it will be understood to those skilled in the art that the embodiments described are examples only. Accordingly, the nonvolatile memory device and the memory system which are described herein should not be limited based on the described embodiments.

What is claimed is:

1. A nonvolatile memory device, comprising:
   a plurality of memory regions; and
   a control logic configured to:
   correct a write command based on a determination that the write command does not match check information for a target memory region of the plurality of memory regions, the write command transmitted from an external device; and
   perform a write operation to the target memory region of the plurality of memory regions using the corrected write command,
   wherein the check information is previously determined before the write command is transmitted from the external device and includes information identifying a write mode associated with the target memory region.

2. The nonvolatile memory device according to claim 1, wherein the control logic determines the write command does not match check information for the target memory region based on whether a write mode of the write command is the same as the write mode associated with the target memory region.

3. The nonvolatile memory device according to claim 1, wherein the control logic comprises a check information memory that:
   stores check information for each memory region of the plurality of memory regions; and
   reads the check information for the target memory region from the check information memory in response to receiving the write command.

4. The nonvolatile memory device according to claim 3, wherein the control logic:
   receives the check information for each memory region of the plurality of memory regions from the external device; and
   stores the received check information for each memory region of the plurality of memory regions in the check information memory.

5. A nonvolatile memory device, comprising:
   a plurality of memory regions; and
   a control logic, the control logic including:
      a check information memory that stores check information for each memory region of the plurality of memory regions, the check information for each memory region including a write mode previously assigned to that memory region; and
      a command checker that reads check information for a target memory region of the plurality of memory regions from the check information memory;
   wherein the control logic performs a write operation to the target memory region based on the check information for the target memory region in response to receiving a write command from an external device,
   wherein the check information is previously determined before receiving the write command from the external device.

6. The nonvolatile memory device according to claim 5, wherein the control logic:
   identifies a write mode associated with the target memory region from the check information of the target memory region; and
   performs the write operation to the target memory region in the identified write mode.

7. The nonvolatile memory device according to claim 6, wherein the control logic:
   corrects, via the command checker, the received write command upon determining that a write mode of the received write command is not the same as a write mode of the check information for the target memory region; and
   performs the write operation to the target memory region in a write mode based on the corrected write command.

8. The nonvolatile memory device according to claim 5, wherein the control logic receives the check information for each memory region of the plurality of memory regions from the external device and stores the received check information to the check information memory.

9. The nonvolatile memory device according to claim 5, wherein the check information for each memory region of the plurality of memory regions includes information identifying a write mode for the memory region.

10. A memory system, comprising:
    a nonvolatile memory device including a plurality of memory regions; and
    a controller configured to:
       transmit a check information table that includes check information for the plurality of memory regions to the nonvolatile memory device, the check information including a write mode previously assigned to each of the memory regions; and then
       transmit a write command and a write mode of the write command to the nonvolatile memory device;
    wherein the nonvolatile memory device performs a write operation in a corrected write mode when the nonvolatile memory device determines, based on the check information table, that the write mode of the write command is erroneous.

11. The memory system according to claim 10, wherein the check information table includes check information for each memory region of the plurality of memory regions; and
    wherein the nonvolatile memory device corrects the write mode of the write command based on check information included in the check information table for a target memory region to which the write operation is to be performed.

12. The memory system according to claim 11, wherein the check information for the target memory region includes information identifying a write mode associated with the target memory region.

13. The memory system according to claim 12, wherein the nonvolatile memory device performs the write operation in the write mode associated with the target memory region when the write mode of the write command is not the same as the write mode associated with the target memory region.

14. The memory system according to claim 10, wherein the nonvolatile memory device includes a check information memory that stores the check information table, and
    wherein the nonvolatile memory device refers to the check information table upon receiving write commands from the controller.

15. The memory system according to claim 10, wherein the controller:
    defines the type of data to be stored in each of the memory regions;
    assigns the write mode to each of the memory regions based on the type of data to be stored in the memory region; and
    generates the check information table based on the write mode assigned to each of the memory regions.

* * * * *